United States Patent
Bostock

(10) Patent No.: US 9,842,127 B2
(45) Date of Patent: *Dec. 12, 2017

(54) DATABASE DIAGNOSTICS INTERFACE SYSTEM

(71) Applicant: Oracle International Corporation, Redwood Shores, CA (US)

(72) Inventor: Clive Bostock, Pickering (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,752

(22) Filed: Nov. 17, 2016

(65) Prior Publication Data

US 2017/0068692 A1 Mar. 9, 2017

Related U.S. Application Data

(63) Continuation of application No. 13/938,418, filed on Jul. 10, 2013, now Pat. No. 9,547,675.

(51) Int. Cl.
*G06F 7/00* (2006.01)
*G06F 17/30* (2006.01)
(Continued)

(52) U.S. Cl.
CPC ...... *G06F 17/30306* (2013.01); *G06F 11/079* (2013.01); *G06F 11/0727* (2013.01);
(Continued)

(58) Field of Classification Search
CPC . G06F 11/079; G06F 11/0748; G06F 2201/80
(Continued)

(56) References Cited

U.S. PATENT DOCUMENTS 6,912,572 B1   6/2005   Fischer
9,547,675 B2 *  1/2017   Bostock ............ G06F 17/30306
(Continued)

FOREIGN PATENT DOCUMENTS

CN   105359143   2/2016
EP    3019978    5/2016
(Continued)

OTHER PUBLICATIONS

International Application No. PCT/US2014/045211, International Preliminary Report on Patentability dated Jan. 21, 2016, 8 pages.
(Continued)

*Primary Examiner* — Van Oberly
(74) *Attorney, Agent, or Firm* — Kilpatrick Townsend & Stockton LLP

(57) ABSTRACT

Systems, methods, and machine-readable media are provided for database diagnostics. A specification of a target database system may be processed. A diagnostic tool, corresponding to a plug-in for transmission to the target database system, may be created. A script may be selected to conditionally execute on the target database system when detected values of a monitored parameter satisfy conditional criteria. A plug-in structure that encapsulates modules of the plug-in may be defined. The diagnostic tool may be transmitted via a network to the target database system to cause the diagnostic tool to be executed on the target database system. The execution of the diagnostic tool may include executing a first iteration of the plug-in based on a first threshold specified by conditional criteria, and executing a subsequent iteration of the plug-in based on a subsequent threshold specified by the conditional criteria after the conditional criteria has been adjusted.

20 Claims, 9 Drawing Sheets

(51) Int. Cl.
*G06F 11/30* (2006.01)
*G06F 11/07* (2006.01)

(52) U.S. Cl.
CPC ...... *G06F 11/0748* (2013.01); *G06F 11/3003* (2013.01); *G06F 11/3065* (2013.01); *G06F 11/3089* (2013.01); *G06F 17/3051* (2013.01); *G06F 17/30292* (2013.01); *G06F 17/30371* (2013.01); *G06F 17/30557* (2013.01); *G06F 2201/80* (2013.01)

(58) Field of Classification Search
USPC .......................................................... 707/764
See application file for complete search history.

(56) References Cited

U.S. PATENT DOCUMENTS

| | | |
|---|---|---|
| 2002/0184065 A1 | 12/2002 | Menard et al. |
| 2005/0289401 A1 | 12/2005 | Goin et al. |
| 2009/0013311 A1 | 1/2009 | Ooba et al. |
| 2010/0318836 A1 | 12/2010 | Ness et al. |
| 2011/0078576 A1 | 3/2011 | Jordan |
| 2015/0019497 A1 | 1/2015 | Bostock |

FOREIGN PATENT DOCUMENTS

| | | |
|---|---|---|
| WO | 0139046 | 5/2001 |
| WO | 2008003077 | 1/2008 |
| WO | 2013022563 | 2/2013 |
| WO | 2015006121 A1 | 1/2015 |
| WO | 2015006121 A9 | 12/2015 |

OTHER PUBLICATIONS

International Application No. PCT/US2014/045211, International Search Report and Written Opinion dated Oct. 27, 2014, 11 pages.
U.S. Appl. No. 13/938,418, Final Office Action dated Jun. 13, 2016, 18 pages.
U.S. Appl. No. 13/938,418, Non-Final Office Action dated Dec. 10, 2015, 16 pages.
U.S. Appl. No. 13/938,418, Notice of Allowance dated Aug. 25, 2016, 12 pages.

* cited by examiner

FIG. 6

DATABASE DIAGNOSTICS INTERFACE SYSTEM

CROSS-REFERENCES TO RELATED APPLICATIONS

The present application is a continuation of U.S. patent application Ser. No. 13/938,418, filed Jul. 10, 2013, entitled "DATABASE DIAGNOSTICS INTERFACE SYSTEM," the entire contents of which are incorporated herein by reference for all purposes.

BACKGROUND

The present invention generally relates to databases and more specifically to apparatus and methods for providing an interface and design tools for diagnosing problems in a database system.

Immediate and accurate diagnosis of problems is important to properly maintain the database systems. As the size and complexity of database systems increase, the likelihood that problems may result also increases. The increased size and complexity, however, also often increases the time and complexity of designing, deploying, and monitoring of database diagnostic tools.

Diagnosing problems in a database may be a very involved task that makes use of a variety of different metrics and database state information. A database administrator (DBA) needs a great deal of expertise to know what diagnostic information is needed to diagnose and resolve a database problem.

Traditionally, when a database problem occurs a DBA is alerted of a problem and then works with database tools to gather and analyze database state information to determine a cause of the problem. Database problems may often be sporadic and may occur or manifest intermittently or randomly and often only for brief periods of time. A DBA may not be available or may only have a small window of time to gather useful database state information in order to accurately diagnose the problem. The type of analysis performed may be subjective in that the DBA may subjectively choose the types of analysis and data to gather to determine a cause of a problem. In many instances the DBA may not have enough time or expertise to run the best diagnostic tool or procedure during the time window when a database problem is occurring resulting in no diagnostics data or diagnostics data that may be irrelevant to the database problem. A DBA may not have time to perform an analysis or may not be able to perform the preferred analysis for the particular database problem.

Accordingly, improved systems, apparatuses, and methods for diagnosing problems are desired.

SUMMARY

In some embodiments, a system for data diagnostics includes one or more processors and memory coupled and readable by the processor. The memory and the processor store a series of instructions such that when executed by the processor they cause the processor to present a graphical user interface to a user. The graphical user interface may permit a selection of a script, the script to be executed on a target database system on occurrence of a condition. The graphical user interface may also permit a one or more parameters to be set, the one or more parameters define a reporting function of the script wherein the reporting function returns data related to the target database system. The system may also define a plug-in structure, wherein the plug-in structure encompasses the script and the one or more parameters and the plug-in further defines the condition which triggers the execution of the script. The system may also cause the plug-in to be executed on the target database system, wherein during execution and on occurrence of the condition, the plug-in may return data related to the target database system according to the one or more parameters.

In embodiments the condition may be a periodic timer and the condition may trigger the execution of the script on a periodic schedule. The condition may also be a threshold value for a parameter of the target database system and in some embodiments the threshold value may be dynamically changed during execution of the plug-in when the threshold value is exceeded. Selection of a script may include selecting a predefined library script from a list of predefined scripts. In embodiments, a plug-in structure may be defined by generating a machine executable module that includes the script functionality.

In another embodiment a method for defining a database system diagnostic tool presents a first graphical user interface that displays options for selecting a script. The method includes the step if selecting, using the first graphical user interface, the script, the script to be executed on a target database system on occurrence of a condition. The method further presents a second graphical user interface that displays options for defining a parameter, the parameter may be a reporting parameter. The reporting parameter may describe a reporting function of the script wherein the reporting function returns data related to the target database system. The method may generate a plug-in structure, the plug-in structure may include the script and the reporting parameter and define the condition which triggers the execution of the script. In addition, the method may present a graphical user interface that displays options for deploying the plug-in structure to a target database system. The plug-in structure may be deployed using the interface and the plug-in may be executed on the target database system, and during execution and on occurrence of the condition, the plug-in may return a data related to the target database system according to the reporting parameter.

In other embodiments a computer program product residing on a non-transitory processor-readable medium and comprising processor readable instructions may be configured to cause one or more processors to present a graphical user interface that displays options for selecting a script. The instruction may be configured to accept a selection, using the graphical user interface, of the script, the script to be executed on a target database system on occurrence of a condition. Additional instructions may cause the graphical user interface to display options for defining a parameter, and accept a selection, using the graphical user interface, of a reporting parameter, the reporting parameter may describe a reporting function of the script. The reporting function may return data related to the target database system. Instructions may generate a plug-in structure, the plug-in structure may include the script and the reporting parameter and the plug-in structure may further define the condition which trigger the execution of the script. Furthermore, the instructions may also cause the graphical user interface to display options for deploying the plug-in structure to the target database system and execute the plug-in on the target database system. During execution, and on occurrence of the condition, the plug-in may return a data related to the target database system according to the reporting parameter.

BRIEF DESCRIPTION OF THE DRAWINGS

A further understanding of the nature and advantages of various embodiments may be realized by reference to the following figures.

FIG. 2 illustrates a block diagram of components of a plug-in.

FIG. 3 illustrates an embodiment of a method for deploying a plug-in.

FIG. 6 illustrates an embodiment of an interface of a system for displaying and designing a configuration.

FIG. 7 illustrates an embodiment of a method for defining and deploying the components of a diagnostics plug-in.

FIG. 8 illustrates another embodiment of a method for defining and deploying the components of a diagnostics plug-in.

DETAILED DESCRIPTION

Figure 1:
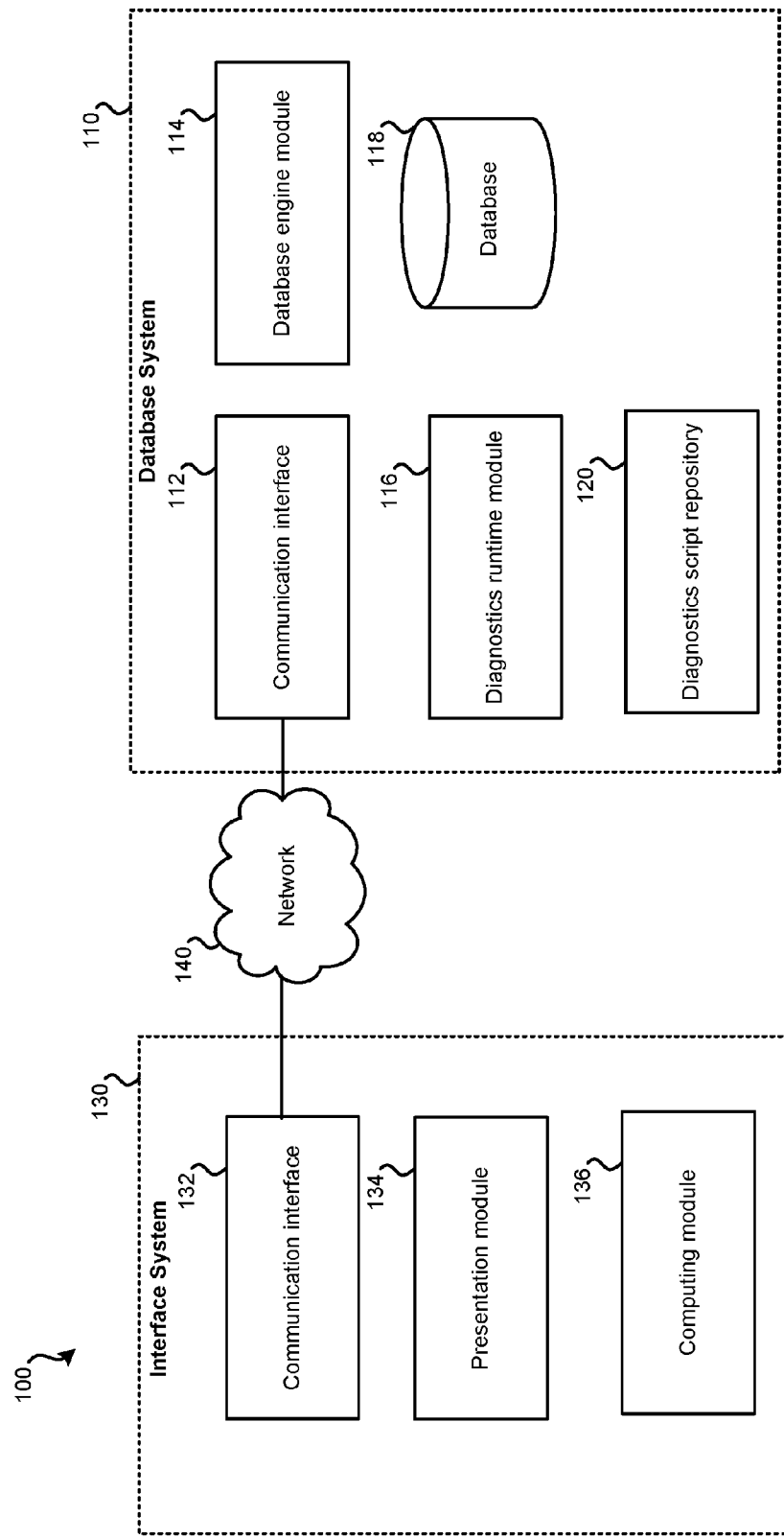
FIG. 1 illustrates a block diagram of an embodiment of a database system with a remote diagnosis interface.

Database problems or performance slowdowns may be difficult to diagnose without a timely and pertinent analysis and reporting of the system. Database diagnostic tools may monitor and report database system state information to help a database administrator (DBA) diagnose a database problem. There are many parameters, actions, behaviors, system states, and/or the like that may signal or mark a database problem or a database performance slowdown. Likewise, there are many database parameters, state information, and behaviors within the database that may be captured and analyzed to diagnose the cause of the database problem. In many complex database systems it is impractical or impossible to monitor, capture, or analyze all possible database parameters, state information, behaviors, and/or the like. A DBA may be required to change the parameters of the database monitoring and reporting tools to monitor and report only a specific set of database system state parameters, behaviors, and/or the like.

As detailed here, a database diagnostics system is presented that may be configured to present an interface system that allows a DBA to define, deploy, and monitor database diagnostic tools. The interface provides access to existing libraries of diagnostic tools. The interface system may also include the capability to create and define new diagnostic tools to monitor or report specific target database system parameters, state, behavior, and/or the like.

Tools created and specified by the interface system may be a combination of modular scripts, configurations, and plug-ins. One or more scripts, configurations, and plug-ins may be assembled or strung together to make up a complex diagnostics task. Each script, configuration, and plug-in is a self-contained reusable module. A DBA may use the interface system to assemble one or more of scripts, configuration, and plug-ins to perform a desired diagnostics task.

The interface system may be local to the database system or may be remote from the database system. The interface may be executed on a system or computer other than the computer executing the target database system. In embodiments the interface system may be coupled with a runtime engine for executing or running the scripts, configurations, and plug-ins created or designed by the interface. The runtime engine may execute the monitoring and reporting tools and transmit the outputs diagnostic tools back to the interface system. The interface system may further comprise tools or functions to catalog, analyze, and modify the outputs of the diagnostic tools transmitted from the database system.

In embodiments, the diagnostic tools executed by the runtime engine may be configured to run periodically or with a "trip-wire" mechanism so that diagnostic data is only gathered when a specific definable database system threshold or parameter state is reached. The periodic or trip-wire execution of the tools by the runtime engine allows automated capture of a database system state even if a DBA is unaware of the database problem or is unavailable to capture the system state information when the problem is occurring.

The diagnostics system is extensible and can be used for monitoring of system state parameters, behaviors, and/or the like as well as reporting and analysis of many different database system state parameters. Reports and monitoring functions of the interface system may be used for gathering performance data, usage data, and/or the like and also used for optimization and fine tuning of the database system.

In embodiments, the diagnostics system comprises two groups of components. The first group of components comprises a diagnostics runtime module configured to operate on the target database system. The second group of components comprises an interface system. The interface system provides a development environment that may be used to define, generate, maintain, and deploy diagnostics tools. The diagnostics tools are executed using the first set of components using the diagnostics runtime modules.

FIG. 1 depicts a system 100 of a database with a diagnostics capability in according to an embodiment of the present invention. System 100 includes an interface system 130 and a database system 110. The database system 110 includes a database module 118 and a database engine module 114. Database engine module 114 is configured to receive and process requests for a database module 118. The database module 118 and the database engine module 114 may be one of a variety of database engines and databases and a person skilled in the art will appreciate the various components of a database engine module 114 and the database module 118.

In embodiments of the database system 110, the system may include a diagnostics runtime module 116 for executing diagnostic tools and an optional diagnostic script repository 120 which stores the diagnostics tools to be executed by the diagnostics runtime module 116. The diagnostics runtime module 116 is at least partially controlled and monitored by the interface system 130. Communication with the database system 110 and the interface system is performed via the communication interfaces 132, 112 of the interface system 130 and database system 110 respectively.

The interface system 130 may comprise a communication interface 132, a presentation module 134, and a computing module 136. The interface system 130 and its elements provide a user with a user interface for generating, monitoring, and deploying diagnostics tools which may be executed at the database system 110 using the diagnostics runtime module 116. Some or all of the functions of each component may be performed by computer hardware, software, and/or firmware. Computer system 900 of FIG. 9 may perform the functions of some or all of the components of the interface system 130 and the database system 110. The functions of the various components may be combined into fewer modules or divided in a greater number of modules.

In one aspect of the embodiment, the interface system may comprise a computer program product residing on a non-transitory processor-readable medium for providing the interface system. The computer program product may include processor-readable instructions configured to cause a processor to generate, change, and deploy the diagnostics tools to the database system. The computer program product may include processor-readable instructions configured to cause the processor to cause an interface of the interface system to be presented that displays a graphical user interface enabling a user to generate, edit, monitor, and deploy the diagnostics tools.

In embodiments of the diagnostics system the interface system 130 may be remote from the database system 110 as depicted in FIG. 1 for example. The interface system may be installed and reside in a separate system, computer system, and/or the like and may communicate or operate with the diagnostics runtime module 116 via a network 140.

In other embodiments of the diagnostics system the interface system 130 may be local to the database system. The interface system may reside and execute in the same computer system as the database system 110. The database system 110 may be deployed in a computer, cluster, network of computers, workstation, server, data center, and/or the like. The modules of the interface system 130 may reside on a memory system of the computer, cluster, network of computers, workstation, server, data center, and/or the like. The interface system and the diagnostic runtime module may communicate via a local network, system bus, local bus, wirelessly and/or the like.

As described herein, the interface system and its elements provide a user with an interface for generating, monitoring, and deploying diagnostics tools executed at the database system using the diagnostics runtime module. The diagnostics tools may comprise a variety of packages, scripts, plug-ins, configurations, executable code, and/or the like. The diagnostic tools may be directly executable or may require an interpreter, a virtual machine, and/or the like on the database system. The exact configuration, structure, and design of the diagnostic tools may depend on the type of target database system, the types of tasks and actions the diagnostic tools are configured to perform, performance or security requirements of the tools, and/or the like.

In embodiments, the diagnostic tools may include database plug-ins. The plug-ins may themselves include one or more scripts controlled by a configuration and assembled into a plug-in structure. The plug-in structure may be deployed to the database system for execution by the diagnostics runtime module.

Figure 2:
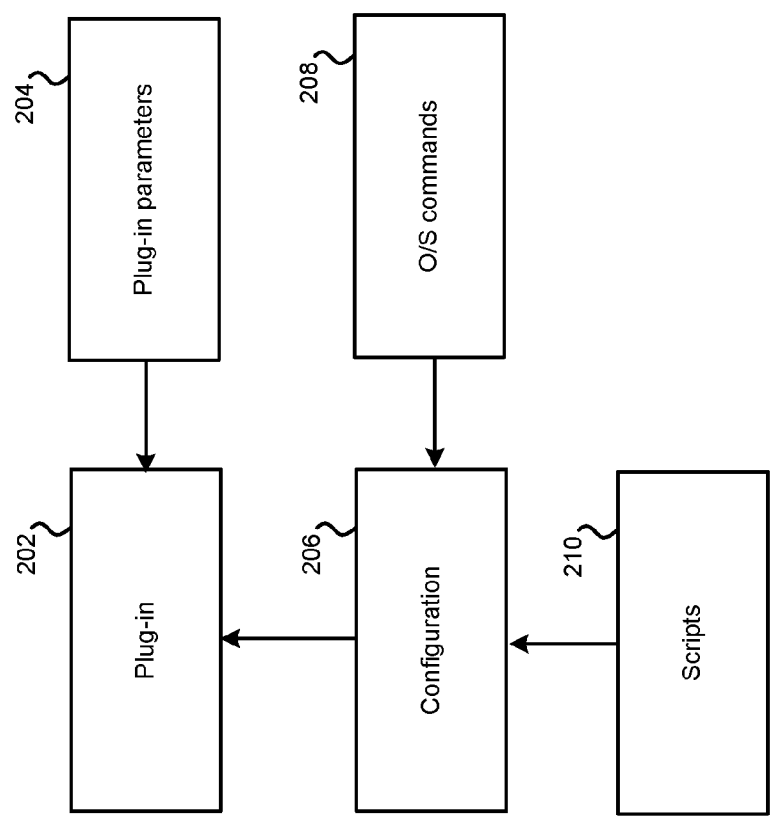

FIG. 2 illustrates the block diagram of the main components of an embodiment of plug-in. A plug-in 202 may comprise submodules such as scripts 210 and/or operating system commands 208. In embodiments the scripts may be scripts comprising SQL, DDL, PLSQL statements or code. The scripts 210 of a plug-in 202 may be configured with additional parameters using a configuration 206. The configuration 206 may be used as containment definition for all the scripts 210 and define parameters such as the execution order of the scripts, the conditions which trigger the execution of each script, the OS commands used to initiate the execution of the scripts, mapping of script functions to database system functions, and/or the like. The plug-in 202 may be configured to reference or point to one or more of the configuration files. Each of the modules of the plug-in, the configuration, the scripts, and/or the like may be modular and reusable. Each plug-in may reference one more configurations. Each configuration may comprise one or more different scripts. Likewise, a configuration and a script may be referenced by one or more different plug-ins or configurations respectively. In this embodiment of a diagnostic tool the scripts 210 of a plug-in 202 may be used as the main building block to define and execute tasks such as monitoring and reporting of the system state of the database system.

In embodiments the plug-in structure may encapsulate the scripts and configurations such that when the plug-in is deployed the scripts and configurations are deployed or transmitted as part of the plug-in to the target database system. In other embodiments the plug-in may only reference or point to scripts of configurations that may already be stored on the database system or in a separate repository accessible by the interface system or the database system. In this embodiment the scripts or the configurations may not need to be transmitted with a plug-in when the plug-in is deployed.

The interface system 130 of the diagnostic system may be used for generating, defining, monitoring, and deploying the plug-ins for execution at the database system 110 using the diagnostics runtime module 116. The interface system may be used to assemble the scripts and configurations into a plug-in to perform a specific diagnostic task. Once all the modules and parts of a plug-in have been defined and packaged, the interface system 130 may be used to transfer the plug-in to the database system 110 for execution by the diagnostics runtime module 116.

Figure 3:
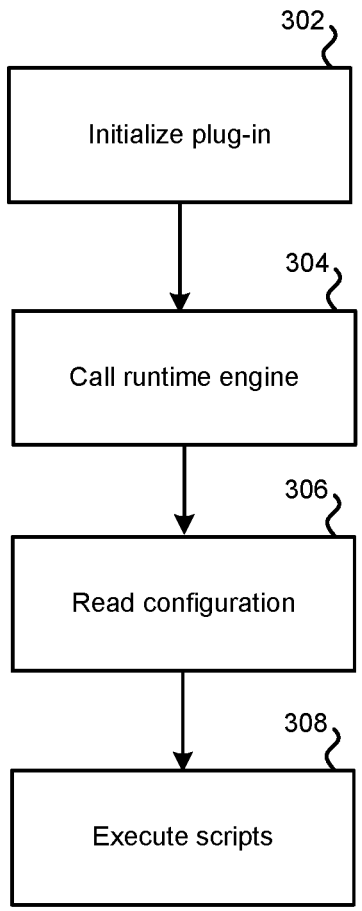

The diagnostics runtime module 116 may initiate and control the execution of the diagnostics tools generated and deployed by the interface system 130. In an embodiment where the diagnostic tool comprises the plug-in structure depicted in FIG. 2 and described herein, the plug-in may be deployed by the interface system by transferring the plug-in to database system 110. On transferred, the plug-in is initialized with a call to the diagnostics runtime module 116 that reads the plug-in, the configurations referenced by the plug-in, and executes the scripts according to the configuration defined in the plug-in. The steps are illustrated in FIG. 3. After a diagnostic tool is deployed to the database system, which in this example the diagnostic tool is a plug-in, the plug-in is initialized in step 302. Initialization of the plug-in may comprise checking its structure, validity, and ensuring the plug-in contains all necessary parts, checking for malicious code, checking that all configurations referenced by the plug-in are either packaged with the plug-in or available in an accessible repository, and/or the like. In the next step after initialization the diagnostic runtime module is called in step 304. The diagnostic runtime module may further parse the plug-in file and read the configuration in step 306. The configuration of the plug-in may comprise the definitions and listings of the scripts associated with the plug-in. The runtime engine may ensure that the referenced scripts are part of the plug-in or are in an accessible repository. In the next step the diagnostic runtime module may start the execution of the scripts in step 308. The execution of the scripts may be scheduled and controlled by the parameters defined in the configuration of the plug-in. During execution of the scripts the scripts may need to perform specific operating system calls, read or write operations, and/or the like. These system calls and other operations may be passed to the operating system of the database system or other program, hardware, and/or the like for processing. The facilities and methods for making system calls, performing read or write operations may be controlled or defined in the configuration of the plug-in and may be different for each database system.

The execution of the diagnostic tools by the diagnostic runtime engine at the database system may be scheduled at intervals or conditionally executed according to criteria. In some embodiments the diagnostic tools may be executed at specific times of the day, specific or random time intervals, specific of random number of times, and/or the like. The diagnostic tools may be scheduled to run one hundred times every 30 seconds and then terminate for example. In some embodiments the diagnostic tools may be executed conditionally based on a parameter or state of the database system. The conditional execution of the diagnostic tool may be based on the activity of the database, parameters of the database state, specific values or variables of the database state and/or the like. The conditional criteria for the execution of the diagnostic tool may be the so called "trip-wire" condition. The diagnostic tool may conditionally execute only when a value of a monitored parameter of the state of the database matches a threshold or range of values. For example, the diagnostic tool may be configured to execute when the average time to perform a query at the database exceeds a predetermined value.

When the trip-wire is triggered the diagnostic tool may be configured to execute and report specific database system parameters or state information to help a DBA diagnose a problem in the database. In some instances, when the trip-wire is triggered the diagnostic tool may be configured to initiate maintenance actions or tasks on the database, alert a DBA, email notifications to users, or initiate actions to resolve the issues.

The trip-wire conditions may be statically set during the design and deployment of the diagnostic tool using the interface system. The trip-wire conditions may also be dynamically set and adjusted during the operation of the database. The diagnostic tool may monitor the state and behavior of the database system and set or adjust the thresholds and trip-wire conditions. The diagnostic tool may be configured to monitor the database parameters and "learn" or accumulate statistics about the normal or expected range of values of the database parameters or database state behavior. The diagnostic tools may continuously or periodically monitor specific database parameters and dynamically set trip-wire conditions for these parameters. The trip-wire condition may be dynamically adjusted based on the time of day, time of the year, and/or the like. For example, the diagnostic tool may gather statistics on the average service time of each query. The query times may normally increase during times of the day when the database experiences heavy volume. The threshold for the trip-wire condition may be increased for the periods of time when volume is high for example.

In embodiments, threshold values may be set at the plug-in level and may be static within the plug-in file. If there is more than one iteration of the plug-in and the threshold is breached, the threshold value may be adjusted to the new breached value and maintained dynamically within the runtime engine. The threshold value may be tracked as the highest value returned by the trip-wire, for example. The plug-in may be configured to activate or run only when the latest maintained threshold value is breached. Every time the plug-in is reinitialized, however, the threshold value may be initialized to the static value from the plug-in script.

In embodiments the interface system may be used to set or define the parameters that are monitored and for which the thresholds are dynamically set. The parameters, behaviors, rules, and/or the like of the dynamically changing trip-wire conditions of the diagnostic tools may be defined in the interface system. The methods and time used to establish a baseline or expected values of a monitored parameter as well as the deviations, or the rate of change which are used to trigger the trip-wire condition may be defined.

In embodiments the diagnostic tools may be configured to be dormant or to sleep for the majority of the time. The diagnostic tools may only be active during brief periods of time or when a problem or a trip-wire is identified in order to limit or minimize the impact or use of resources of the database system.

For the structure of the diagnostic tools depicted in FIG. 2, the execution criteria may be defined in the configuration of the plug-in. The interface system used to define and deploy the plug-in may be operable to allow modification and design of the configuration. The configuration may be used to define how, when, in what order the scripts of the plug-in are executed by the diagnostic run-time module. The configuration of the plug-in may define scheduling of the execution of the scripts. Some of the scripts may be defined in the configuration to execute periodically, every 1, 10, or more minutes for example. The configuration may define the trip-wire conditions which trigger the execution of one or more scripts defined in the plug-in. The configuration may define conditional statements such as SQL statements defining the trip-wire conditions which trigger the execution of one or more scripts. The configuration may define the scheduling or order of the execution of the scripts based on the output or behavior of the database system after the execution of one script. The configuration may be defined to execute a monitoring script, which may monitor one or more parameters or behaviors of the database. The monitoring script may be configured to return on or more values to the diagnostic runtime engine. The configuration of the plug-in may define conditional, default, preferred, and/or the like action or script execution order or schedule of other scripts based on the output of the monitoring script.

In some embodiments the scripts may be defined with monitoring or reporting capability. A script with monitoring capability may, once executed by the diagnostics runtime module of the database, monitor one or more parameters, values, behaviors, and/or the like of the database system. The monitoring scripts may return one or more values during their execution or at the completion of their execution. The return values of the monitoring scripts may be used as the trip-wire conditions to initiate the execution of other monitoring scripts, initiate the execution of reporting scripts, or change the execution schedule or order of the execution of the scripts defined in the in plug-in. A script with a reporting capability may, once executed by the diagnostics runtime engine of the database system, report one or more values, parameters, behaviors, state information, and/or the like of the database system. The output of the reporting script may be communicated to the interface system and may be defined to return information about the database that may be useful for diagnosing database problems.

The monitoring and reporting functions of the scripts may be combined into one script. A single script may define both functions without departing from the spirit and structure of the diagnostic system outlined herein. Likewise, in some embodiments the reporting and monitoring functions may be split across many different scripts that are executed to perform one or more monitoring or reporting tasks.

In embodiments, the reporting, monitoring, execution, trip-wire, threshold parameters and the like may be defined in various modules and components of the plug-in. The parameters may be defined in different levels of the plug-in depending on the function of the plug-in and the scripts. In some embodiments the parameters may be defined in more than one level of the plug-in (i.e. defined in a script, configuration, and plug-in). A hierarchy of parameters may be defined in more than one location. A parameter definition at a plug-in level, for example, may override definitions of the same parameter at a script level. The hierarchy may be defined as having the script level the lowest in the hierarchy, configuration level the second lowest, and the plug-in definitions having the highest level. In one example, the plug-in may include parameter definitions which include the trip-wire and threshold parameters, scheduler options, O/S commands and communication channel parameters, plug-in name parameter, configuration options, and report directory locations. When a plug-in references a configuration which contains a number of scripts, some of which may have embedded parameters defined, the plug-in may automatically copy the parameters defined in the configuration and scripts and provide definitions for these parameters at the plug-in level. In a case where the parameters are defined in more than one level the parameter definitions may be consolidated and prioritized based on their hierarchy of definition.

Returning now to the interface system of the diagnostic system. As described above the interface system of the diagnostic system may be used for generating, defining, monitoring, and deploying the plug-ins. The interface system may be used to assemble the scripts and configurations into a plug-in that may be deployed and executed by the diagnostic runtime engine of the database system. The interface system may be used to define the parameters such as the execution schedule of the scripts, the trip-wire conditions, the reporting parameters and/or the like. The interface system provides an interface that expedites the creation of possibly complex monitoring and reporting scripts and functions.

In embodiments the interface system may present a graphical interface to a user with selection and input controls to configure, define, and deploy a plug-in. The presentation module 134 of the interface system may serve to present a user with a graphical user interface (GUI). Presentation module 134 may be available to the user via a remote connection. For instance, the presentation module 134 may involve a web-based graphical user interface being presented to the user via a web browser. As such, the user may interact with the interface system remotely across a network, such as the Internet.

Figure 4:
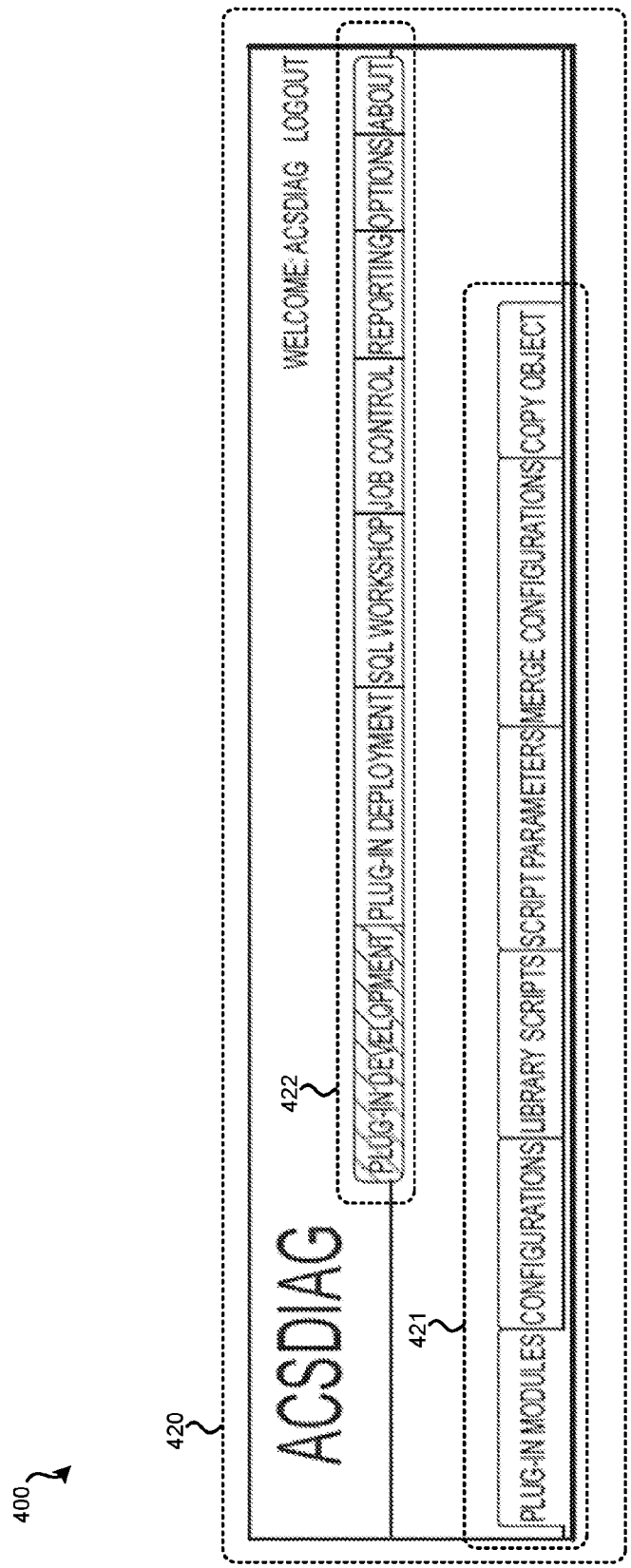
FIG. 4 illustrates an embodiment of an interface of a system for designing and deploying diagnostics plug-ins.

FIG. 4 illustrates an embodiment of a graphical user interface of an interface system. The GUI may be web-based. As such, a user may interact with the GUI across a network via a web browser. The GUI of FIG. 4 may correspond or may be generated by the presentation module 134 of the system of FIG. 1. The GUI in FIG. 4 illustrates the main navigation options and methods for interacting with the GUI in order to design, define, modify, and deploy the diagnostic tools. The interface navigation pane 420 comprises a main function selection menu bar in the top level tabs 422. The top level tabs 422 select the mode of the interface. The top level tabs 422 selects the mode of the GUI between the major types of tasks associated with the interface system. In the embodiment shown in FIG. 4, top level tabs 422 allow the selection between the modes of plug-in development ("Plug-in Development"), plug-in deployment ("Plug-in Deployment"), reporting ("Reporting"), and several other tool functions such as an SQL edit function ("SQL Workshop"), job control ("Job Control"). Depending on the selection of the top level tabs 422, the interface navigation pane 420 of the GUI may have lower level tabs 421 that provide more options for each task of the top level tabs 422. The illustration of FIG. 4 shows an example lower level tabs 421 for the plug-in development task. For the specific diagnostic tool embodiments described herein the lower level tabs 421 for the plug-in development task may comprise functions for defining script parameters ("Script Parameters"), defining library scripts ("Library Scripts"), defining configurations ("Configurations"), and defining plug-in modules ("Plug-in Modules"). The lower level tabs 421 for the plug-in development task may further comprise options for functions to allow merging of configurations ("Merge Configurations") or copying of objects ("Copy Object").

Figure 5:
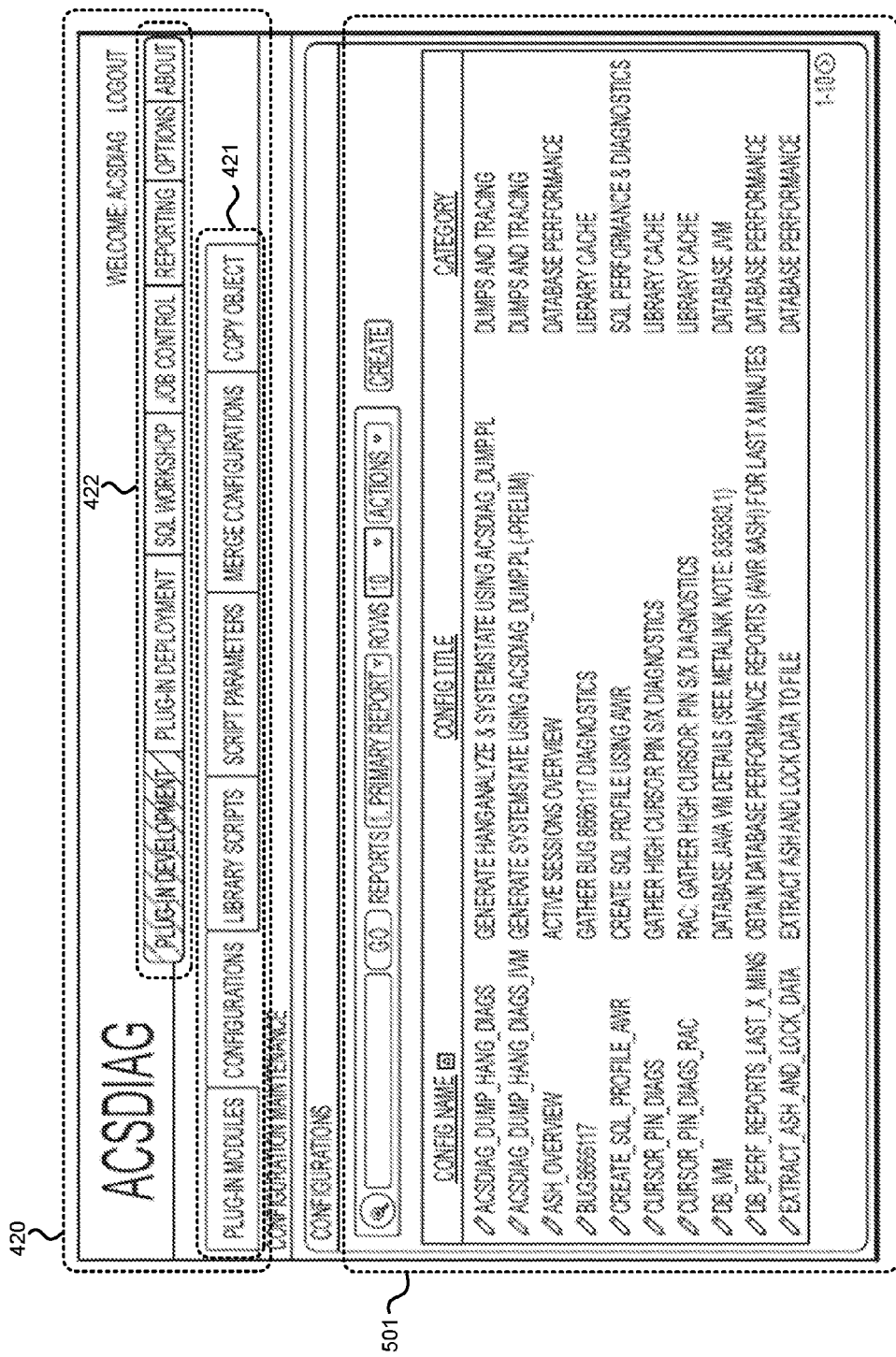
FIG. 5 illustrates an embodiment of an interface of a system for displaying and designing a configuration from a library of configurations.
Figure 6:
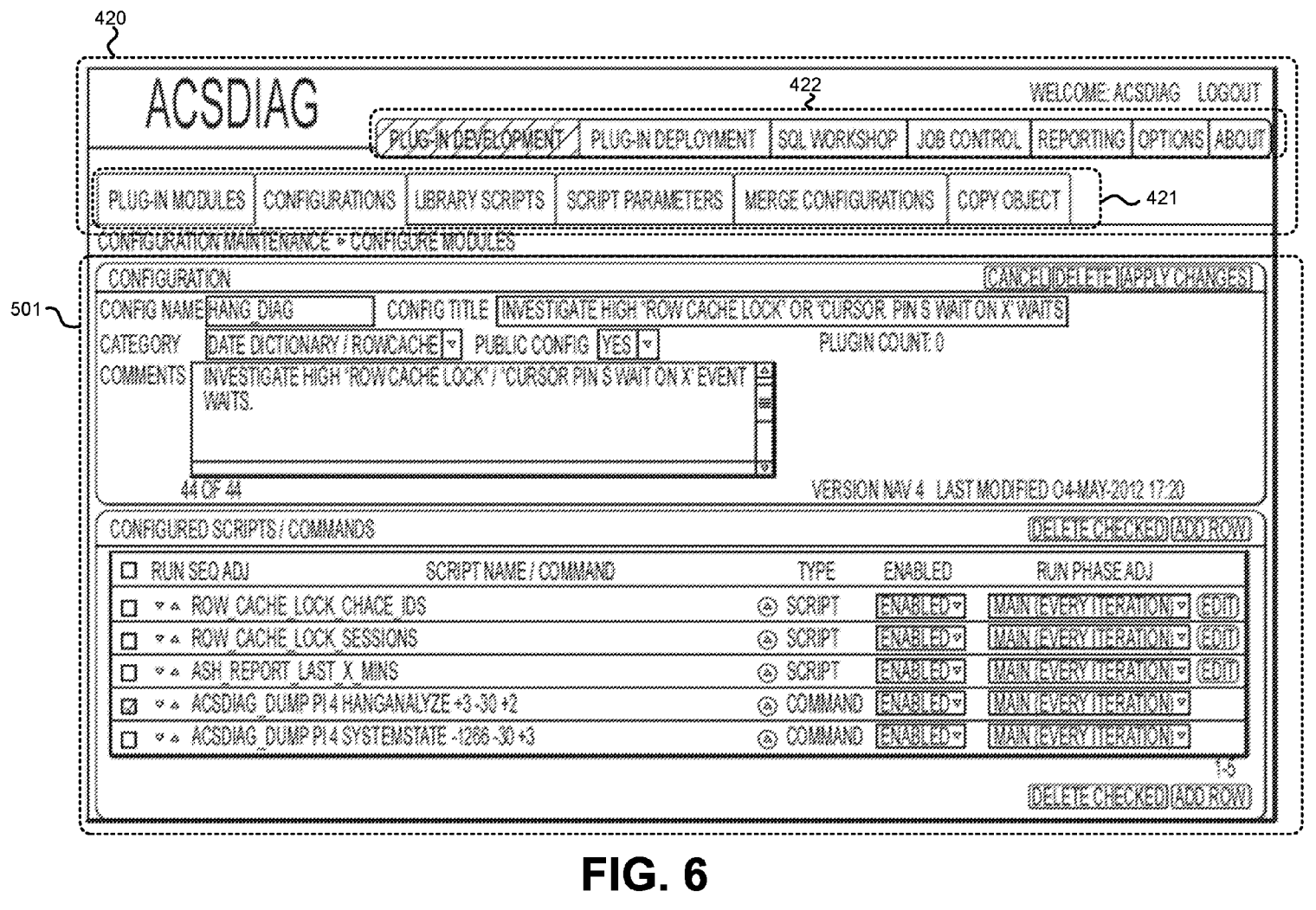

Selection of a specific lower level tab 421, may initiate the display of more options or tools for defining the specific function selected in the lower level tab 421. FIG. 5 illustrates the GUI with an additional function definition area 501 under the interface navigation pane 420. The function definition area 501 comprises options and tools for defining the specific functions of a lower level tabs 421 selection. The function definition area 501 may change or have additional views depending on the operations performed within the function definition area 501. The function definition area 501 may have one or more views with different input controls depending on the actions taken in the function definition area 501. The function definition area 501, for example is different in FIG. 5 and FIG. 6 for the same selection of the top level tabs 422 and the lower level tabs 421. In FIG. 5 the function definition area 501 in FIG. 5 is configured with a control to select a configuration from a list of library configurations while in the function definition area 501 in FIG. 6 is configured with controls to define or edit the parameters of a configuration.

The "Plug-In Development" selection of the top level tabs 422 defines the selection of the lower level tabs 421 and a function definition area 501 for choosing and defining the components and parameters of diagnostics tools. In the example embodiment described herein the defining of the diagnostics tools comprises defining scripts, script parameters, configurations, configuration parameters, plug-ins, and plug-in parameters.

When defining the library scripts that comprise the plug-in during the "Plug-In Development" task of the top level tabs 422 the function definition area 501 of the GUI may present a control for selecting, viewing, and listing of predefined scripts. The control may comprise sections to view the parameters, the source code, or edit each script. The control may read a local or remote repository of existing scripts to display to the user. Alternatively, when defining the scripts that comprise the plug-in, the function definition area of the GUI may comprise controls for inserting parameters of the script, description of the script, the types of script language used to define the script, and/or the like. The GUI may comprise a script source code reception area for inserting of script code by the user. The source code reception area may validate the source code for errors and provide for templates to fill in the source code with reusable code snippets, headers, and/or the like.

When defining the configurations that comprise the plug-in, the function definition area 501 of the GUI may present a control for selecting and listing of predefined configurations. The view control may comprise sections to view the parameters, the source code, or edit each configuration. The control may read a local or remote repository of existing configurations to display to the user. Alternatively, when defining the configurations, the function definition area 501 of the GUI may comprise input controls for inserting parameters of the configuration, description of the configuration, and the category of the configuration. When creating or editing the configuration, the GUI may comprise a script selection control for selecting the scripts referenced by the configuration. The control for selecting of scripts may optionally comprise a user input for scheduling of the execution of the script, defining the "trip-wire" conditions that initiate the execution of each script, the execution order of the scripts of the configuration, schedule conditions, and/or the like.

When defining the plug-in, the function definition area 501 of the GUI may provide a control for selecting and listing of predefined plug-ins. The view control for selecting and listing of predefined plug-ins may comprise areas to view the parameters and configurations of each plug-in. The selection and view control of the plug-ins may read a local or remote repository of existing plug-ins to display to the user. Alternatively, when defining the plug-in, the function definition area 501 of the GUI may comprise input controls for inserting parameters of for the plug-in, description of the plug-in, the output parameters and destination, and/or the like. When creating or editing the plug-in the GUI may comprise a configuration selection control for selecting the configurations referenced by the plug-in. The control for editing the plug-in may comprise a user input for scheduling of the execution of the plug-in, defining the "trip-wire" conditions that initiate the execution of each plug-in and therefore the set of scripts and configurations defined by each plug-in. Defining the execution schedule of the plug-in may comprise controls for input of the number of iterations of execution, the sleep interval between the executions, the scheduler used for scheduling the execution, and/or the like.

During the development of the plug-in, the GUI may present tools to merge configurations or copy or merge plug-ins, configuration parameters, plug-in parameters, and/or the like. The marge operation may be used to combine the function of one or more scripts, configurations, or plug-ins into a larger module. During merge configuration operations the function definition area 501 of the GUI may provide for a selection control for selecting of configurations to merge.

The "Plug-In Deployment" selection of the top level tabs 422 may provide for lower level tabs and controls in the function definition area 501 for selecting the already defined scripts, plug-ins, and configurations modules for deployment to a target database system. During the "Plug-in Deployment" function of the top level tabs, the lower level tabs may provide functions for loading defined scripts, loading defined configurations, generating configurations, and generating a plug-in for deployment. When defining the components to deploy, the function definition area 501 of the GUI may provide a control for selecting and listing of defined library components. The deployment function of the GUI may create a packaged plug-in with all of the necessary configurations, scripts, and definitions that may be executed by the diagnostics runtime module at the target database.

In embodiments, the interface system may present options for transformation of code from one type to another. The interface system may present a background transformation tool. A computing module 136 of the interface system may be configured to transform code of the scripts, configurations and plug-ins received by the GUI of the interface system to create and output target code. For example, if a script is entered in a SQL language syntax, the script code received may be transformed by the computing module to another script language code such as PLSQL. Transforming one code to another may involve one or more transformation tools running on the computing module of the interface system.

It should be understood that the layout and specific information presented within GUI may vary in other embodiments. For instance, the layout and components of GUI may be modified to present more or less information or input options to the user at a given time. The layout and components of the GUI may be modified to present a different interface to the user to define, monitor, and deploy the diagnostics tools.

In a different embodiment, for example, the GUI may be modified to present a question and answer type interface to the user. In the interface, the diagnostic tools may be defined by a series of questions presented in the GUI. The GUI may present questions regarding the type of analysis or monitoring the user wants to perform, the symptoms of the problems the database is experiencing, and/or the like. The GUI may present a control with multiple choice inputs or another input control allowing a user to define his own answers to the presented questions. Based on the answers provided, the interface system may choose one or more diagnostic tools to meet the criteria. In embodiments the interface system may assemble a set of scripts, configurations, and plug-ins based on the answers provided by the user, or present the user with a choice of several diagnostic tools that match or correspond to the answers provided. The user may be presented with an additional input control for editing, selecting, or modifying the presented diagnostic tools. The question and answer interface may provide a simpler interface for a novice user allowing the user to focus on the problems or diagnostics of the database and not on the diagnostic tools themselves. In embodiments the GUI of the interface system may have a mixture of interfaces and may comprise two or more modes of operations. One mode may be the so called "expert mode", allowing a user to input, define, and specify most or all of the diagnostic tool parameters. In another mode the GUI of the interface system may present a simplified interface, such as the question and answer interface.

In another embodiment, the interface system may present the user with a text based or terminal based interface. The user interface may rely only on text input and output to define the diagnostic tools.

In embodiments the interface system may be customized for each user, database system, or customer. The interface system may have a number of predefined library diagnostic tools which may comprise scripts, configurations, plug-ins, and/or the like. The predefined tools may be customized for each database system, each user, or customer. The interface may automatically determine the database system for which the diagnostic tools are being designed for and filter the lists of available predefined tools to those only applicable to that database system.

As described herein the diagnostic tools and the corresponding modules and elements that make up a diagnostic tool may be reusable and modular. The interface may provide for options to import diagnostics tools from an external source or repository. The interface system may accept a diagnostic tool, such as a plug-in, that was emailed or sent electronically to the user by a third party. The diagnostic tool may be imported into the interface and deployed to the database system using the interface system.

Figure 7:
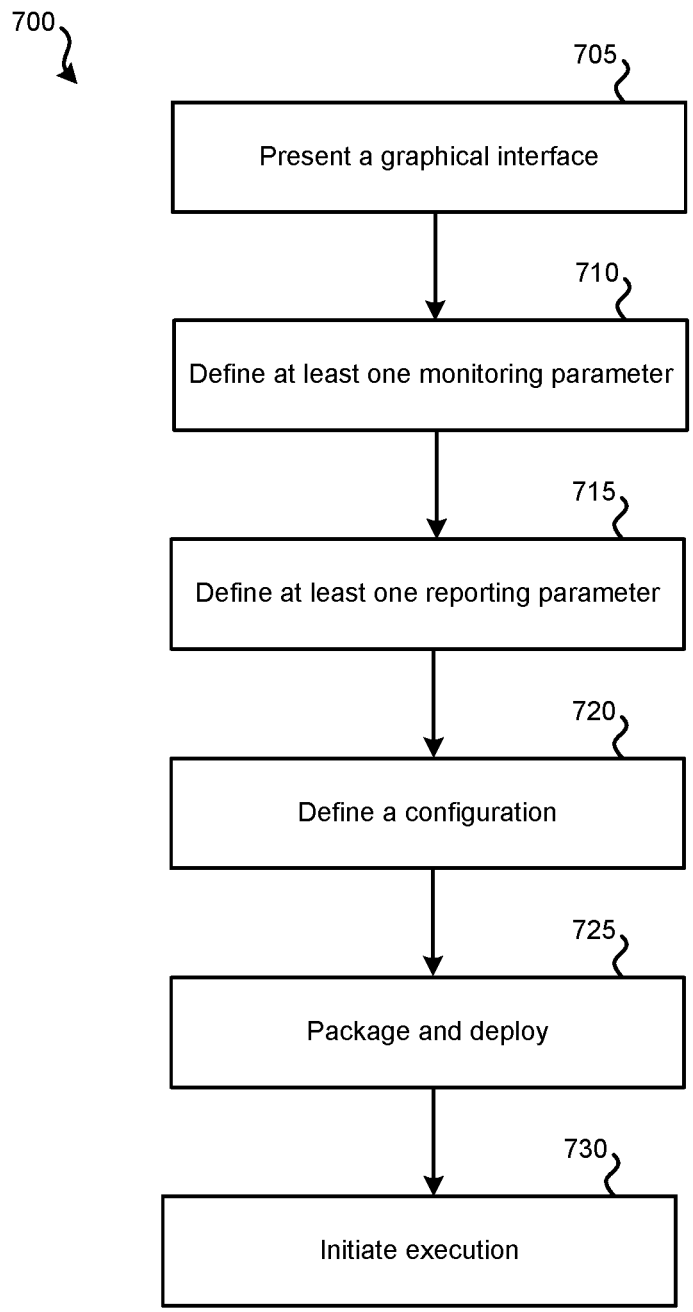

Various methods may be performed using the system of FIG. 1 and/or the GUI of FIG. 5. FIG. 7 illustrates an embodiment of a method 700 for defining a diagnostic tool. Each step of method 700 may be performed using system 100 of FIG. 1 or some other system configured to present an interface system GUI for the diagnostic tools. Each step of method 700 may be performed by a computer system. For example, computer system 900 of FIG. 9 may be used to perform each step of method 700. Accordingly, means for performing method 700 include one or more computer systems, networks, and/or a remote computer system.

At step 705 of the method of FIG. 7, the GUI of the interface system may be presented. The graphical interface may be presented at an output device of the interface system, such as a monitor, a mobile screen device, computer, and/or the like. The GUI interface may be a graphical interface shown in FIG. 5 and present the user with options to define, monitor, and deploy diagnostic tools. The interface may have a variety of input controls for receiving input from the user. The GUI may have controls for text, multiple choice, touch, controls and/or the like.

At step 710, at least one monitoring parameter of the diagnostic tool may be defined. The GUI may present the user with options for defining aspects of monitoring for a database system. The user may define what states, behaviors, and/or the like the diagnostic tools may monitor or track. The defining step may comprise selecting a script from a list of one or more predefined scripts.

At step 715, at least one reporting parameter of the diagnostic tool may be defined. The GUI may present the user with options for defining aspects of reporting for a database system. The user may define what states, behaviors, and/or the like the diagnostic tools may track or report back to the user. The defining step may comprise selecting a script from a list of one or more predefined scripts. The defining step 715 may define the states, behaviors, and/or the like to capture from the database that may be useful for diagnosing database problems or optimizing performance of the database.

At step 720, the configuration of the diagnostic tool may be defined. The GUI may present the user with options for defining aspects of the configuration. The configuration may define one or more parameters such as the execution schedule of the scripts, trip-wire conditions, reporting options, and/or the like discussed herein.

At step 725, the diagnostic tool may be packaged and deployed to the target database system. The GUI may present the user with options for defining and initiating the packaging of diagnostic tool. Packaging may comprise putting together the scripts for performing monitoring/reporting and configurations into a plug-in structure. The GUI may present the user with options for transmitting the packaged plug-in to the database.

At step 730, the execution of the packaged and deployed diagnostics tool may initiate. The diagnostic runtime engine at the database system may initiate the execution. The GUI at the interface system may present the user with options for initiating, stopping, or pausing the execution of the deployed diagnostic tool.

Figure 8:
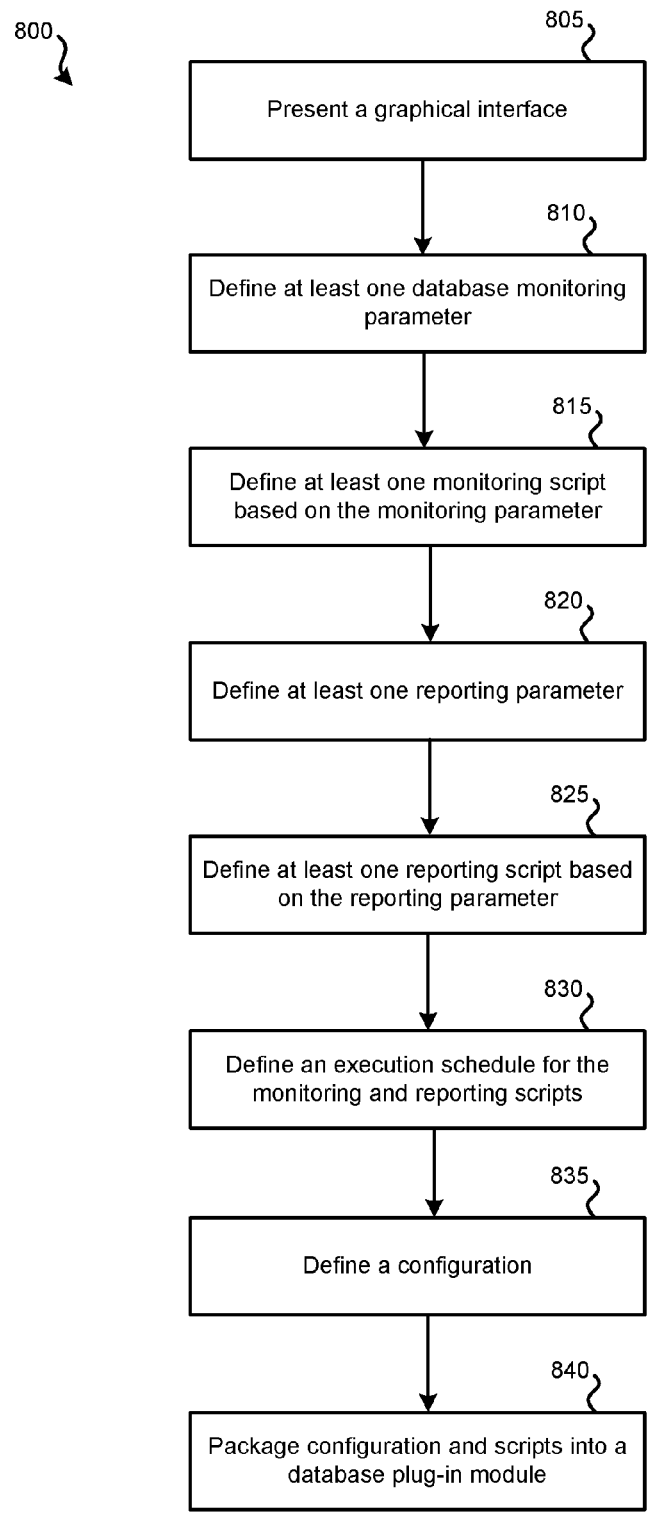

FIG. 8 illustrates another embodiment of a method 800 for defining a diagnostic tool. Each step of method 800 may be performed using system 100 of FIG. 1 or some other system configured to present an interface system GUI for the diagnostic tools. Each step of method 800 may be performed by a computer system. For example, computer system 900 of FIG. 9 may be used to perform each step of method 800. Accordingly, means for performing method 800 include one or more computer systems, networks, and/or a remote computer system.

At step 805 of the method of FIG. 8, the GUI of the interface system may be presented. The graphical interface may be presented at an output device of the interface system, such as a monitor, a mobile screen device, computer, and/or the like. The GUI interface may be a graphical interface shown in FIG. 5 and present the user with options to define, monitor, and deploy diagnostic tools. The interface may have a variety of input controls for receiving input from the user. The GUI may have controls for text, multiple choice, touch, controls and/or the like.

At step 810, at least one monitoring parameter of the diagnostic tool may be defined. The GUI may present the user with options for defining aspects of monitoring parameters for a database system. The user may define what parameters, states, behaviors, and/or the like the diagnostic tools may monitor or track. The defining step may comprise selecting one or more monitoring parameters from a list of one or more predefined parameters.

At step 815, at least one script based on the monitoring parameters defined in step 810 may be defined. The GUI may present the user with options for defining aspects of the monitoring script based on the monitoring parameters. The script may be defined by the user by defining the script using script source code. In embodiments defining the script may comprise automatically, or semi automatically generating the script. The script may be generated by templates with the monitoring parameters from step 810, wherein the templates are populated automatically with the defined parameters.

At step 820, at least one reporting parameter of the diagnostic tool may be defined. The GUI may present the user with options for defining aspects of reporting parameters for a database system. The user may define what parameters, states, behaviors, and/or the like the diagnostic tools may track or report back to the user. The defining step 820 may define the parameters, states, behaviors, and/or the like to capture from the database that may be useful for diagnosing database problems or optimizing performance.

At step 825, at least one script based on the reporting parameters defined in step 820 may be defined. The GUI may present the user with options for defining aspects of the reporting script based on the reporting parameters. The script may be defined by the user by defining the script using script source code. In embodiments defining the script may comprise automatically, or semi automatically generating the script. The script may be generated by templates with the reporting parameters from step 820 wherein the templates are populated automatically with the defined parameters.

At step 830, at least one execution parameter of the diagnostic tool may be defined. The GUI may present the user with options for defining aspects of the execution order, trip-wire conditions, repetition, and/or the like for a database system. The user may define what how often, and how many times the scripts defined in the previous steps are executed. The user may define trip-wire conditions or define other conditional statements that may control the execution of the scripts.

At step 835, at least one configuration based on the execution parameters defined in step 830 may be defined. The GUI may present the user with options for defining aspects of the configuration based on the execution parameters. The configuration may be defined by the user by defining the configuration using code, script language, markup language, and/or the like. In embodiments defining the configuration may comprise automatically, or semi automatically generating the configuration code. The configuration may be generated by templates with the execution parameters from step 830 wherein the templates are populated automatically with the defined parameters.

At step 840, the diagnostic tool may be packaged and deployed to the target database system. The GUI may present the user with options for defining and initiating the packaging of diagnostic tool. Packaging may comprise putting together the defined monitoring scripts, reporting scripts, and configurations into a plug-in structure. The GUI may present the user with options for transmitting the packaged plug-in to the database.

Figure 9:
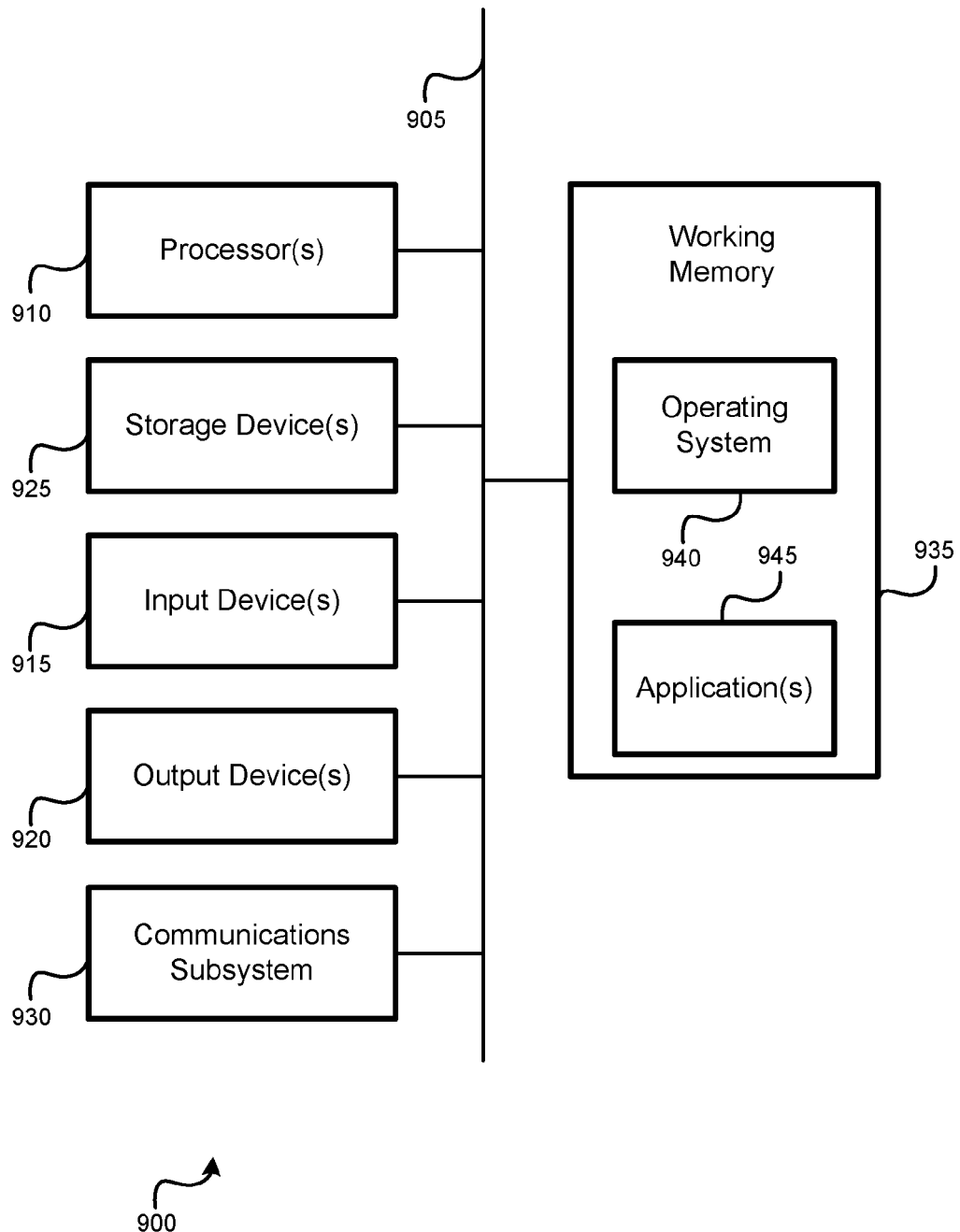
FIG. 9 illustrates an embodiment of a computer system.
Figure 2:
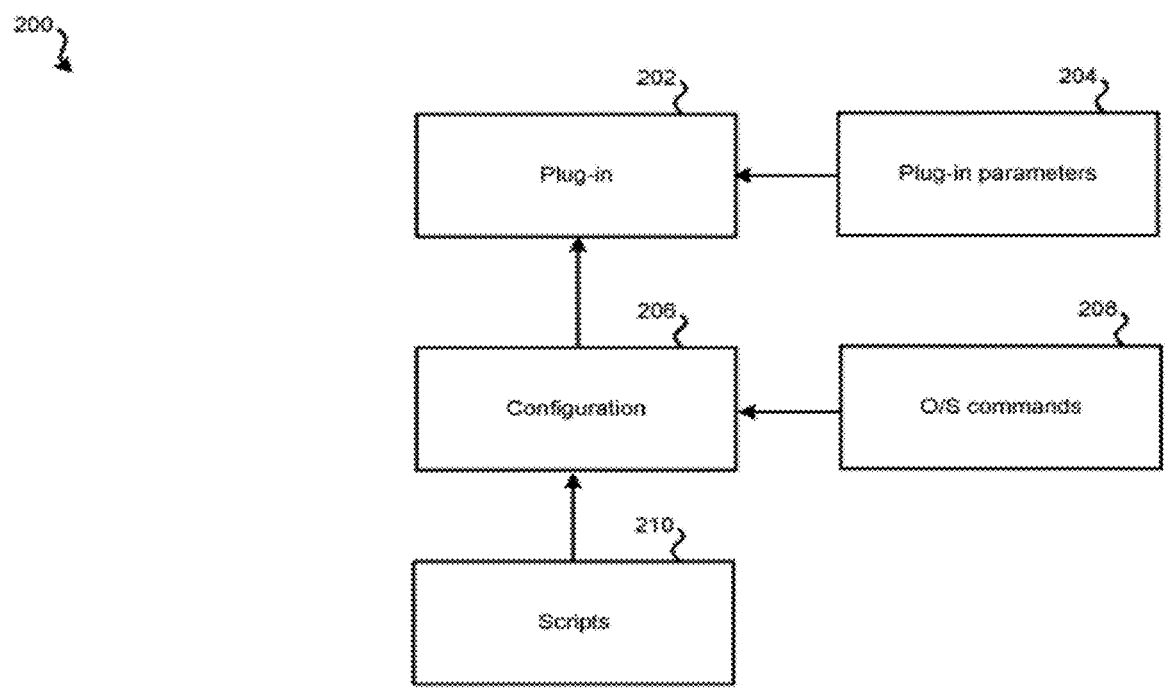

FIG. 9 illustrates an embodiment of a computer system. A computer system as illustrated in FIG. 9 may be incorporated as part of the previously described computerized systems, such as system 100 of FIG. 1. Computer system 900 can represent the computer systems and/or the remote computer systems discussed in this application. FIG. 9 provides a schematic illustration of an embodiment of a computer system 900 that can perform the methods provided by various embodiments, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processors 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system can be distributed across a network. For example, some processing may be performed in one location using a first processor while other processing may be performed by another processor remote from the first processor. Other components of computer system 900 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, wellknown circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed:

1. A database diagnostics system comprising:
one or more processors; and
a memory communicatively coupled with and readable by the one or more processors and having stored therein instructions which, when executed by the one or more processors, cause the one or more processors to:
 process a specification of a target database system that is located remotely from the one or more processors;
 create a diagnostic tool, corresponding to a plug-in for transmission to the target database system, at least in part by:
  selecting a script from a set of predefined scripts, the script to conditionally execute on the target database system when detected values of a monitored parameter of the target database system satisfy conditional criteria;
  defining a plug-in structure that encapsulates modules of the plug-in corresponding at least in part to the script and a configuration;
  defining the configuration, the defining the configuration comprising defining:
   a mapping of one or more script functions to database system functions of the target database system; and
   conditional criteria which triggers execution of the script after the script is transmitted to the target database system, wherein the conditional criteria is dynamically adjusted to specify different thresholds over time based at least in part on the detected values of the monitored parameter of the target database system; and
  assembling the script and the configuration into the plug-in to perform a diagnostic task based at least in part on the plug-in structure; and
 cause transmission of the diagnostic tool via a network to the target database system to cause the diagnostic tool to be executed on the target database system, wherein the execution of the diagnostic tool comprises:
  executing a first iteration of the plug-in based at least in part on a first threshold specified by the conditional criteria; and
  executing a subsequent iteration of the plug-in based at least in part on a subsequent threshold specified by the conditional criteria after the conditional criteria has been adjusted.

2. The database diagnostics system of claim 1, wherein:
the execution of the diagnostic tool further causes the diagnostic tool to monitor one or more parameters of the target database system; and
accumulate statistics about the one or more parameters;

wherein the conditional criteria is dynamically adjusted based at least in part on the statistics accumulated.

3. The database diagnostics system of claim 2, wherein the diagnostic tool monitors the one or more parameters continuously.

4. The database diagnostics system of claim 2, wherein the diagnostic tool monitors the one or more parameters periodically.

5. The database diagnostics system of claim 2, wherein the conditional criteria is dynamically adjusted according to one or more temporal bases.

6. The database diagnostics system of claim 5, wherein the statistics about the one or more parameters comprise statistics on average service times of queries for different periods of time.

7. The database diagnostics system of claim 6, wherein:
the first threshold specified by the conditional criteria corresponds to a first time period; and
the subsequent threshold specified by the conditional criteria corresponds to a second time period and is specified based at least in part on the statistics on the average service times.

8. A method of database diagnostics, the method comprising:
processing a specification of a target database system;
creating a diagnostic tool, corresponding to a plug-in for transmission to the target database system, at least in part by:
selecting a script from a set of predefined scripts, the script to conditionally execute on the target database system when detected values of a monitored parameter of the target database system satisfy conditional criteria;
defining a plug-in structure that encapsulates modules of the plug-in corresponding at least in part to the script and a configuration;
defining the configuration, the defining the configuration comprising defining:
a mapping of one or more script functions to database system functions of the target database system; and
conditional criteria which triggers execution of the script after the script is transmitted to the target database system, wherein the conditional criteria is dynamically adjusted to specify different thresholds over time based at least in part on the detected values of the monitored parameter of the target database system; and
assembling the script and the configuration into the plug-in to perform a diagnostic task based at least in part on the plug-in structure; and
causing transmission of the diagnostic tool via a network to the target database system to cause the diagnostic tool to be executed on the target database system, wherein the execution of the diagnostic tool comprises:
executing a first iteration of the plug-in based at least in part on a first threshold specified by the conditional criteria; and
executing a subsequent iteration of the plug-in based at least in part on a subsequent threshold specified by the conditional criteria after the conditional criteria has been adjusted.

9. The method of claim 8, wherein:
the execution of the diagnostic tool further causes the diagnostic tool to monitor one or more parameters of the target database system; and
accumulate statistics about the one or more parameters;
wherein the conditional criteria is dynamically adjusted based at least in part on the statistics accumulated.

10. The method of claim 9, wherein the diagnostic tool monitors the one or more parameters continuously.

11. The method of claim 9, wherein the diagnostic tool monitors the one or more parameters periodically.

12. The method of claim 9, wherein the conditional criteria is dynamically adjusted according to one or more temporal bases.

13. The method of claim 12, wherein the statistics about the one or more parameters comprise statistics on average service times of queries for different periods of time.

14. The method of claim 13, wherein:
the first threshold specified by the conditional criteria corresponds to a first time period; and
the subsequent threshold specified by the conditional criteria corresponds to a second time period and is specified based at least in part on the statistics on the average service times.

15. One or more non-transitory, machine-readable media having machine-readable instructions thereon, which, when executed by one or more processing devices, cause the one or more processing devices to:
process a specification of a target database system that is located remotely from the one or more processing devices;
create a diagnostic tool, corresponding to a plug-in for transmission to the target database system, at least in part by:
selecting a script from a set of predefined scripts, the script to conditionally execute on the target database system when detected values of a monitored parameter of the target database system satisfy conditional criteria;
defining a plug-in structure that encapsulates modules of the plug-in corresponding at least in part to the script and a configuration;
defining the configuration, the defining the configuration comprising defining:
a mapping of one or more script functions to database system functions of the target database system; and
conditional criteria which triggers execution of the script after the script is transmitted to the target database system, wherein the conditional criteria is dynamically adjusted to specify different thresholds over time based at least in part on the detected values of the monitored parameter of the target database system; and
assembling the script and the configuration into the plug-in to perform a diagnostic task based at least in part on the plug-in structure; and
cause transmission of the diagnostic tool via a network to the target database system to cause the diagnostic tool to be executed on the target database system, wherein the execution of the diagnostic tool comprises:
executing a first iteration of the plug-in based at least in part on a first threshold specified by the conditional criteria; and
executing a subsequent iteration of the plug-in based at least in part on a subsequent threshold specified by the conditional criteria after the conditional criteria has been adjusted.

16. The one or more non-transitory, machine-readable media of claim 15, wherein:

the execution of the diagnostic tool further causes the diagnostic tool to monitor one or more parameters of the target database system; and accumulate statistics about the one or more parameters; wherein the conditional criteria is dynamically adjusted based at least in part on the statistics accumulated.

17. The one or more non-transitory, machine-readable media of claim 16, wherein the diagnostic tool monitors the one or more parameters continuously.

18. The one or more non-transitory, machine-readable media of claim 16, wherein the diagnostic tool monitors the one or more parameters periodically.

19. The one or more non-transitory, machine-readable media of claim 16, wherein the conditional criteria is dynamically adjusted according to one or more temporal bases.

20. The one or more non-transitory, machine-readable media of claim 16, wherein the statistics about the one or more parameters comprise statistics on average service times of queries for different periods of time.

* * * * *

UNITED STATES PATENT AND TRADEMARK OFFICE
CERTIFICATE OF CORRECTION

PATENT NO. : 9,842,127 B2  
APPLICATION NO. : 15/354752  
DATED : December 12, 2017  
INVENTOR(S) : Bostock Page 1 of 2

It is certified that error appears in the above-identified patent and that said Letters Patent is hereby corrected as shown below:

In the Drawings

On sheet 2 of 9, replace FIG. 2 with FIG. 2 as shown on the attached sheet.

Signed and Sealed this  
Tenth Day of July, 2018

Andrei Iancu  
*Director of the United States Patent and Trademark Office*